Figure 1:
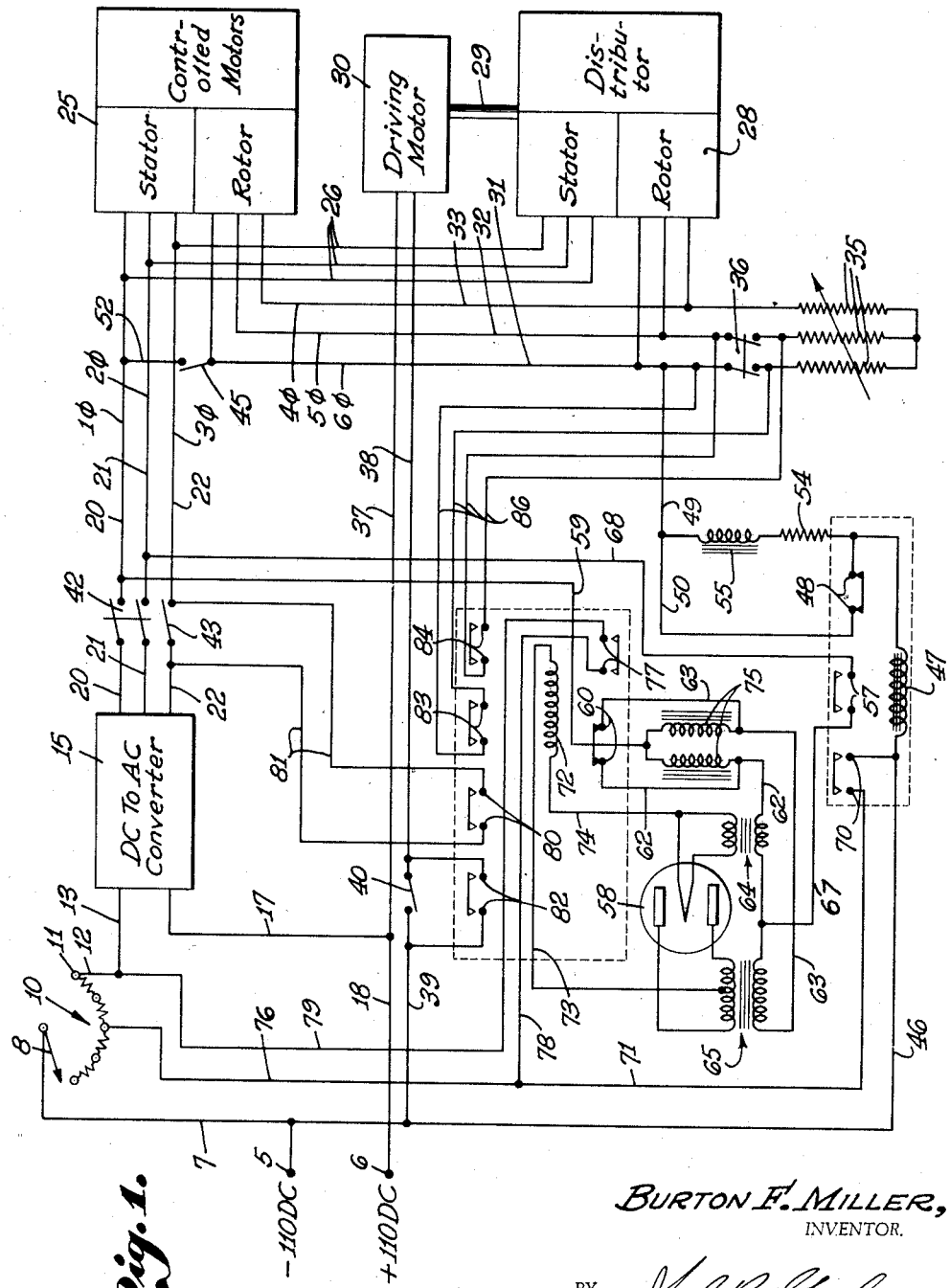

July 25, 1944.   B. F. MILLER   2,354,329
MOTOR STARTING SYSTEM
Filed Oct. 7, 1942   2 Sheets-Sheet 1

BURTON F. MILLER,
INVENTOR.

BY

ATTORNEY.

July 25, 1944.   B. F. MILLER   2,354,329
MOTOR STARTING SYSTEM
Filed Oct. 7, 1942   2 Sheets-Sheet 2

BURTON F. MILLER,
INVENTOR.

BY

ATTORNEY.

Patented July 25, 1944

2,354,329

UNITED STATES PATENT OFFICE 2,354,329

MOTOR STARTING SYSTEM

Burton F. Miller, Beverly Hills, Calif., assignor to Radio Corporation of America, a corporation of Delaware Application October 7, 1942, Serial No. 461,136

15 Claims. (Cl. 172—293)

This invention relates to A. C. interlock or Selsyn motor starting systems and particularly to such systems for controlling the starting of motion picture camera motors in synchronism with sound recorder motors.

It is well known in the art of motion picture production that synchronous interlocked motors are employed to drive the picture cameras and sound recorders at separated locations. Such drive systems as illustrated in U. S. Patent No. 2,301,910 of November 10, 1942, and U. S. Patent No. 2,310,340 of February 9, 1943, utilize a distributor-generator whose polyphase stator windings together with the polyphase stator windings of the camera and recorder motors are connected to an A. C. source. The polyphase rotor circuits are interconnected and paralleled by a predetermined amount of resistance. The distributor is rotated at a constant speed by a driving motor which may be either D. C. or synchronous for producing the necessary rotating currents in the rotor circuits to permit of uniform rotation of the rotors. In the starting arrangements for such drive systems, it is necessary for the motors to be electrically locked in position, which is usually done by first connecting one phase of all the stators to the power source to initially position the rotors and then by connecting the other two phases to the power source to increase the electrical interlock. Power is then applied to the driving motor to rotate the distributor. When the interlock is applied to all three phases simultaneously there is danger of the motors running away as they may be so far out of phase that large circulating currents occur, which produce such great acceleration that the rotors overshoot the line-up position and continue to rotate. Energization of the last two phases of the interlock and energization of the driving motor may be accomplished simultaneously, although it is preferable to provide a short time delay between these connections as well as between the energization of the first phase and the other two phases. In the past these connections have been made manually, the sequence and amounts of time delay being subject to the skill of the operator.

The present invention is directed to automatic starting systems for interlock motors wherein it is only necessary for the operator to actuate a single switch to initiate the necessary series of connections for locking up the motors and applying energy to the driving motor, the sequence of operations and the necessary time intervals between them being predetermined to insure optimum starting conditions at all times. Two modifications of the invention are disclosed herein, one utilizing a direct current source of energy in which a direct current to alternating current converter and a direct current driving motor is employed. The other modification is adapted for use with alternating current such as a 220 volt, three phase, 60 cycle source. The same fundamental principle for obtaining the properly timed sequence of operations for locking up of the motors and applying energy to the driving motor is embodied in both systems, the timing being accomplished by vacuum tube rectifiers. In this manner optimum starting conditions are assured at all times.

The principal object of the invention, therefore, is to automatically control the sequence of connections for starting a plurality of alternating current interlocked motors.

Another object of the invention is to provide an automatic control system for a plurality of alternating current interlock motors.

A further object of the invention is to provide an improved method and system for automatically connecting a plurality of Selsyn motors to a power supply for synchronous operation.

A further object of the invention is to provide an automatic starting system for a plurality of interlocked motors wherein a plurality of predetermined timed series of connections is obtained by the use of electronic devices.

Although the novel features which are believed to be characteristic of this invention are pointed out with particularity in the claims appended herewith, the manner of its organization and the mode of its operation will be better understood by referring to the following description, read in conjunction with the accompanying drawings, in which:

Fig. 1 is a combination schematic and diagrammatic drawing of an embodiment of the invention employing a direct current power source, and, Fig. 2 is a diagrammatic and schematic drawing of an embodiment of the invention utilizing a three-phase alternating current power source.

Referring now to Fig. 1, a 110-volt source is connected across terminals 5 and 6 on the left-hand side of the drawing, terminal 5 being connected by conductor 7 to a movable arm 9 of a manual starting box 10 having a plurality of tapped resistance sections. The right-hand terminal 11 of the sections is connected by conductors 12 and 13 to a direct current to alternating current converter 15, the return connection being over conductors 17 and 18 to the plus terminal 6 of the direct current power supply. Thus, for manual operation, as the arm 8 is swung to the right and contact made with the first terminal, direct current will be fed to the converter 15 and three-phase A. C. will be generated.

The output of the converter 15 is impressed over three-phase conductors 20, 21 and 22 to the stators of A. C. interlock or Selsyn motors shown diagrammatically at 25, such as are commonly used in the cameras and sound recorders of motion picture recording systems. The three-phase conductors 20, 21 and 22 are also shown connected over conductors 26 to the stator of the distributor diagrammatically represented by the box 28, the rotor of the distributor 28 being adapted to be rotated by shaft 29 connected to a D. C. driving motor 30. The rotors of the controlled motors of the cameras and sound recorder and the rotor of the distributor are shown interconnected over conductors 31, 32 and 33, three resistances 35 being adapted to be connected across the rotors when a switch 36 is closed. The direct current driving motor for the distributor is energized from the D. C. source over conductors 10, 37, 38 and 39 when a switch 40 is closed.

Thus, to manually operate the above system, the arm 8 of the starting box 10 is first moved across the resistance contacts to the point 11 to generate three-phase alternating currents. As soon as a stable output voltage is established, a switch 42 is thrown, energizing one-phase of the stators of the motors and the stator of the distributor over conductors 20 and 21 and two of conductors 26. After a short interval to permit the rotors to electrically line up, switch 43 is thrown to tighten the electrical lock and the switches 36 and 40 closed to close the rotor circuit in parallel with resistances 35 and to energize the driving motor 30 of the distributor 28.

To accomplish these results automatically, the above connections are placed under control of a single switch such as shown at 45. When the switch 45 is closed a circuit is completed from the negative terminal 5 of the D. C. power source over conductor 46, through a relay winding 47, switch contacts 48, conductor 50, conductor 49, then over rotor conductor 31, switch 45, conductor 52, stator conductor 20, switch 42, which remains closed during automatic operation, through converter 15 and over conductors 17 and 18 to the positive terminal 6 of the direct current source. Rotor conductor 31 and stator conductor 20 are employed in the automatic control circuit, since they are present at all motor positions and these conductors are not electrically connected.

Thus, the closing of switch 45 will energize relay 47 which simultaneously opens contacts 48 and closes contacts 57 and 70 to accomplish the following three operations. First, the normally closed contacts 48 are broken to reduce the current through the winding 47 by adding a resistance 54 and an inductance 55 in the relay winding circuit, which permits the winding of this relay to be operated indefinitely without overheating. The closing of contacts 57 closes an energizing circuit for an electronic-rectifier tube 58 over one phase of the stator windings. This energizing circuit is from phase 1 or stator conductor 20 over conductor 59, to contacts 60, then in parallel over conductors 62 and 63 to the primary of filament winding transformer 64 and the primary of anode transformer 65, then over conductor 67, contacts 57 and conductor 68 to phase 2 or stator conductor 21. The closing of contacts 70 connects the converter to the power terminals 5—6 over a circuit from the terminal 5, over conductor 46, contacts 70, conductor 71, conductor 76, middle terminal of the starting box 10, conductors 12 and 13, through converter 15 and over conductors 17 and 18 to the positive terminal 6 of the power supply. Thus, when contacts 57 and 70 are closed the converter is started through a portion of the resistance box and energy immediately is supplied to the filament and anodes of the rectifier tube 58. The ratio of the windings of the filament heating transformer 64 is so chosen that when the converter 15 is up to the maximum speed obtainable from the mid-tap on the resistance starting box 10, sufficient filament voltage is provided to permit the rectifier 58 to operate relay 72 within a predetermined time period.

When the rectifier tube 58 has been heated to supply sufficient current to operate the relay 72 over conductors 73 and 74, the remaining starting connections are made by the simultaneous closing of contacts 77, 80, 82, 83 and 84 and the opening of contacts 60. First, the normally closed contacts 60 are broken, inserting retard coils 75 in the transformer energizing circuits which sets up a normal operating condition for the rectifier 58 when the converter 15 has attained full speed. Next, normally open contacts 77 are closed which will impress the full running voltage from the power source on the D. C. motor of the converter 15. This circuit is from the negative terminal 5 of the D. C. power source, over conductor 46, contacts 70, conductor 71, conductor 78, contacts 77, conductors 79 and 13, through the converter 15, and over conductors 17 and 18 to the positive terminal 6 of the source of energy. The closing of contacts 80 connects the other two phases of the stator windings by shorting the switch 43 over conductors 81. The closing of contacts 82 shorts the switch 40 and the driving motor 30 is energized over conductors 16, 37, 38 and 39. The closing of contacts 83 and 84 shorts the switch 36 over a plurality of conductors 86 to connect the rheostat resistances 35 across the rotors of the motors and distributor.

Thus, from the above it will be observed that after the manual closing of the single switch 45 (switch 42 always being closed for automatic operation), the starting connections follow in a predetermined sequence with the proper time intervals between the connections requiring such time intervals. Thus, the actuation of relay 47 starts the converter 15 through a resistance, connects the rectifier 58 to the A. C. generator and locks up a single phase of the stators of the controlled motors and distributor. The actuation of relay 72, after a sufficient time period to permit these rotors to reach their line-up positions connects full voltage to the converter, locks the other two phases and energizes the driving motor for the distributor. The necessary resistances are also connected across the rotor circuits, and the impedances of the relay circuits are adjusted to secure normal relay currents.

Referring now to Fig. 2, an all alternating current system as illustrated in the above mentioned patents is shown wherein the distributor is diagrammatically represented by a box 90 and the control motors are represented by a box 91, while the three-phase synchronous driving motor is represented by a box 92. The 220-volt, three-phase, 60 cycle power source is connected to terminals 94 while one terminal of a 110-volt A. C.

power source is connected at 95, and the other or ground terminal is connected at 96.

To permit a clear understanding of the automatic operation, manual operation of the system will first be described. To energize the first phase of the stators, a momentary starting switch 97 is shown in the upper right-hand corner, which switch will energize relay winding 98 over a circuit from terminal 95 over conductor 99, switch 97, conductor 100 and winding 98, to terminal 96. Energization of the winding 98 will close contacts 104, contacts 105, contacts 106, and contacts 107. The closing of contacts 104 will lock up the relay 98 over a circuit from the terminal 95, conductor 99, normally closed stop switch 110, conductor 111, normally closed contact 112 of a relay 113, conductor 114, contacts 104 and winding 98 to terminal 96. Thus, the switch 97 can be released and the relay 98 will remain energized.

The closing of contacts 105 and 106 will impress energy on the stators of the controlled motors and the distributor from two of the terminals 94 over conductors 116, closed contacts 105 and 106 and over conductors 117 and 118 to the stators of the distributor 90 and controlled motors 91. The closing of contacts 107 will connect the terminal 96 over conductors 120, 121 and 122 to the left-hand terminal of relay winding 125, which is normally disconnected from the terminal 96. Now the momentary closing of the second start switch 126 will energize relay winding 125 over a circuit from the terminal 95, conductor 99, closed switch 126, conductor 127, relay winding 125, conductor 122, closed contacts 107 and conductors 121 and 120 to terminal 96. The energization of relay 125 will simultaneously close contacts 129, 130, 131 and 132.

The closing of contacts 129 will lock up the relay 125 over a circuit from the terminal 95, conductor 99, closed off switch 134, conductor 135 and closed contacts 129 back to the terminal 96. Thus, the switch 126 may be released and the relay 125 will remain actuated. The closing of contacts 130 will energize the other two phases of the stators of the distributor and motors from the third terminal of terminals 94 over conductor 137, contacts 130 and over conductors 138 and 139 to the respective stators. This will tighten the electrical lock on the distributor and motors preventing any run-away condition. The closing of contacts 131 of relay 125 will energize an indicating lamp 141 over a circuit from terminal 95, conductor 99, conductor 142, closed contacts 131, conductor 143 and through the lamp 141 to the ground 142' or terminal 96. The closing of contacts 132, similar to the closing of contact 107 of relay 98, will connect relay winding 144 to terminal 96 over conductors 120, 145, contacts 132, and conductor 146.

The closing of the third start switch 148 will thus energize the relay 144 over a circuit from terminal 95, conductor 99, switch 148, conductor 149 to relay 144 and then over the ground circuit just traced through relays 98 and 125 to terminal 96. The closing of switch 148 simultaneously energizes relay 151 over a circuit from the terminal 95, conductor 99, switch 148, conductor 152, conductor 197, relay winding 151 and conductor 153 to the terminal 96 through the above-traced ground circuit. The actuation of relay 144 closes its contacts 155, 156, 157 and 158 and the actuation of relay 151 closes its contacts 159, 160, and 161 and opens its contact 162. The closing of contacts 155 of relay 144 and contacts 159 of relay 151 locks these relays closed through a circuit from terminal 95 over conductor 99, closed switch 164, conductor 165, through contacts 155 to relay 144, and over a parallel conductor 166, through contacts 159 to relay 151. Thus, the third starting switch 148 may be opened and the relays 144 and 151 remain energized. The closing of contacts 156, 157, and 158 connects the driving motor 92 to the three-phase terminals 94 over conductors 168 through contacts 156, 157 and 158 and conductors 169, thus energizing the driving motor and rotating the distributor. Simultaneously, the closing of contacts 160 and 161 will connect a variable rheostat 171 across the rotors of the system over conductors 172, contacts 160 and 161, conductors 173, and conductors 174.

It will be noted that a closed switch 220 is shown in conductor 149 in the energizing circuit for the relay 144 which connects the power source to the distributor driving motor. If it is desired to operate the motor system at non-synchronous speeds, this switch may be opened thus preventing the operation of relay 144 when switch 148 is closed. The distributor and controlled motors then operate as normal three-phase induction motors, the speed of which is determined by the amount of resistance connected across the rotor circuits by rheostat 171.

Thus, to operate the system manually the start switches 97, 126 and 148 are operated in that sequence, switch 97 being closed first to interlock one phase of the stators of the motors and distributor, switch 126 being closed next to tighten the lock by energizing all three phases of the stators of the distributor and motor, the time interval between the closing of switches 97 and 126 permitting the single phase lock to line up the rotors, and switch 148 being closed last to energize the driving motor for rotating the distributor and to connect the resistances 171 across the rotor circuit. The system now to be described automatically makes these connections with the optimum time interval between operations, it only being necessary for the operator to close a single switch such as shown at 175.

When the main power switch (not shown) of the system is thrown, a circuit is completed from the terminal 95 over conductor 99 through the primary winding of a transformer 176 over conductor 177, conductor 178, conductor 145 and conductor 120 to terminal 96. The energizing of this circuit, however, does not accomplish any result until the switch 175 is closed, which closes the secondary circuit of the transformer 176 over a circuit from the upper terminal of the secondary winding of transformer 176 over conductor 179, switch 175, conductor 180, winding of relay 113 and conductor 181, to the lower terminal of the secondary of transformer 176. The closing of switch 175, therefore, energizes relay 113, causing the same to actuate its armature, the normally closed contacts being shown by dark arrows and the normally open contacts being shown by light arrows. A rotor conductor and a stator conductor may be used for switch 175 as in Fig. 1 for switch 45.

The closing of contact 183 completes a circuit from terminal 95 over conductor 99, conductor 184, closed contact 183, conductor 185, through the primary of transformer 186 over conductor 187, conductor 178, conductor 145 and conductor 120 to terminal 96 of the 110-volt power supply. Thus, energization of the fullwave rectifier tube 188 is begun, the secondaries of transformer 186 being connected to its filament and anodes.

Energization of relay 113 also closes contact 189, the closing of this contact energizing relay 98 over a circuit from terminal 95, conductor 99, closed stop-switch 110, conductor 111, closed contact 189, conductor 190, conductor 100 and relay winding 98 to terminal 96. The energization of relay 98 will, therefore, energize one phase of the stator windings in the same manner as the manual closing of switch 97 described above, this connection being made immediately upon the energization of relay 113.

Energization of relay 113 also closes a contact 192, the closing of which performs no immediate function, but does complete a circuit over conductor 193, closed contact 194, conductor 195, conductor 166, conductor 165, closes switch 164 and conductor 99 to terminal 95, the other portion of the circuit being from contact 192 over conductor 196 and to the terminals of relays 151 and 144 over conductor 197 in parallel with conductors 152 and 149 and then to contacts 132 of relay 125. Ordinarily this circuit just traced would energize relays 144 and 151, but as the circuit can only be completed when contacts 132 of relay 125 are closed, relays 144 and 151 will not be actuated. The energization of relay 125, however, will become effective only upon the closing of contact 200 of relay 201, this latter relay becoming energized only after the electronic rectifier tube 188 has become operative. There is, therefore, a time delay introduced between the energization of the first and other two phases of the stators, the magnitude of the time delay being dependent upon the time required for heating the filament of rectifier tube 188 and upon the time constant of the circuit made up of a resistance 202, a condenser 203, relay winding 201 and the resistance of the rectifier tube 188. When the relay 201 is energized after the predetermined time interval over conductors 204 and 205, a circuit will be completed over closed contact 200 from terminal 95, conductor 99, closed switch 134, conductor 135, conductor 206, closed contact 200, conductor 207, conductor 127 to relay 125 and terminal 96 over closed contact 107 of relay 98. After relay 125 has been energized and closes its contacts 129, this relay will be locked up over the original locking circuit formerly traced using conductors 135 and closed switch 134. With the closing of contacts 130 of relay 125, energization of all three phases of the stator windings will be complete over conductors 137, 138, and 139.

Although the operation of relay 125 closes contacts 132 which would permit completion of the energization circuit for relays 144 and 151, formerly traced over normally closed contact 194, contact 194 has now been opened by the actuation of relay 201 and consequently this energization circuit is broken. That is, the energization circuit of relays 144 and 151 is not completed by the actuation of relay 201 because this relay simultaneously breaks the energization circuit at contact 194 while completing the circuit at contacts 132, so power is not immediately supplied to the driving motor over contacts 156, 157 and 158. However, the actuation of relay 201 breaks the filament heating circuit for the rectifier 188 at contact 210, since this circuit is from contact 210 over conductor 211, normally closed contact 162, conductor 212, secondary winding 213, conductor 214, filament of tube 188 and conductor 215 to the contact 210. Thus, the breaking of this filament circuit will deenergize relay 201 and after a time interval determined by the values of series resistance 202 and shunt condenser 204, the relay 201 will be restored to its normal position which will close contact 194 to energize relays 144 and 151 over the circuits traced above. The energization of relays 144 and 151 will lock these relays by closing respective contacts 155 and 159 over circuits traced above for manual operation and three-phase power will be supplied to the driving motor 92 over closed contacts 156, 157 and 158, and the resistance box 171 will be connected across the rotors by the closing of contacts 160 and 161.

The de-energization of relay 201 will again close contact 210 which would normally close the filament circuit of the rectifier 188. However, the relay 151 will open contact 162 in the filament heating circuit and rectifier 188 will remain de-energized during the running operation of the system. Relay 113 will remain energized since switch 175 remains closed.

The above circuit system thus provides a predetermined series of operational sequences with predetermined time intervals between them. That is, the order of the connections is first, the energization of a single phase of the stators of the controlled motors and distributor and second, the energization of the other two phases with the required time delay being introduced by the heating period required for rectifier tube 188 and the time constants of the relay circuit. The third connection is the energization of the driving motor for the distributor and the connection of the necessary resistances across the rotor windings, a time delay being produced between the second and third connections by the timed de-energization of the relay 201. In this manner predetermined timed starting connections are obtained which insures that all the motors will be properly and sufficiently locked to prevent the motors from running away. The system has been found to shorten the average total starting period of the motors, since the minimum of time is always taken for the sequence of operations, which is shorter than generally obtained by the manual operations of the switches 97, 126, and 148, while any error in the operation of these switches in the wrong order is prevented. Therefore, less trouble is encountered in the starting and operation of A. C. interlock and Selsyn motor systems with the use of the above-described system.

I claim as my invention:

1. A starting system for a plurality of motors having polyphase stator and rotor windings adapted to be started and run in synchronism comprising a distributor having polyphase stator and rotor windings, a polyphase power source, switching means for connecting one phase of the stators of said motors and of said distributor to said polyphase power source, switching means for connecting the other two phases of said stators to said power source, a driving motor for said distributor, switching means for energizing said driving motor, means for controlling the sequence of operation of each of said switching means in a predetermined order, and a single manually operable switch for actuating said last mentioned means.

2. A starting system in accordance with claim 1 in which means are included in said means for controlling the sequence of operations of said switching means for obtaining predetermined time intervals between said switching operations.

3. A starting system in accordance with claim 1 in which electronic means are provided for controlling the sequence and time of operation of one of said switching means, said electronic means being under the control of said single switch.

4. A motor starting system comprising a plurality of motors adapted to be started and run in synchronism, said motors having polyphase stator and rotor windings, a distributor having polyphase stator and rotor windings, the rotor of said distributor being interconnected with the rotors of said motors, a motor for driving said distributor, a power source, a plurality of interlocking relays, the first of said relays connecting one phase of the stator windings of said distributor and one phase of the stator windings of said motors to said power source, the second of said relays connecting the other two phases of the stator windings of said distributor and the stator windings of said motors to said power source; and, the third of said relays connecting said driving motor to said power source, and means for obtaining a predetermined time interval between the operation of said relays.

5. A motor starting system in accordance with claim 4 in which one of said relays includes an electronic device, the time of operation of said relay being controlled by the heating time of said electronic device and the time constant of the connections between said electronic device and said relay.

6. A motor starting system in accordance with claim 4 in which is provided a thermionic rectifier, the heating time of said rectifier and the time constant of the output circuit thereof controlling the time of operation of one of said relays after said rectifier is energized, the time constant of said relay circuit controlling the time of de-energization of said relay after said rectifier is de-energized.

7. A motor starting system for a plurality of motors adapted to be started and run in synchronism with each other, said motors having polyphase stator and rotor windings comprising a D. C. to A. C. converter, a distributor-generator having polyphase stator and rotor windings, a direct current motor for rotating said distributor-generator, a direct current power source, a plurality of relays, the first of said relays being adapted to partially energize said converter from said power source and energize one phase of the stator windings of said motors and the stator windings of said distributor-generator from said converter, and the second of said relays being adapted to fully energize said converter from said power source, energize the other two phases of the stator windings of said motors and the stator windings of said distributor-generator from said converter and connect said D. C. motor to said power source, and a thermionic device for providing a time delay between operation of said relays.

8. A motor starting system in accordance with claim 7 in which a plurality of resistances are provided, said last-mentioned relay connecting said resistances across the rotor windings of said motors and distributor.

9. A motor starting system in accordance with claim 7 in which means are provided in the circuits for said relays for reducing the energizing current thereto during the operation of said motors.

10. A motor starting system in accordance with claim 7 in which means are provided in the energizing circuit for said thermionic device to reduce the energy supplied thereto in accordance with the output energy of said converter.

11. A motor starting system comprising a plurality of Selsyn motors having polyphase stator and rotor windings, a distributor for said motors having polyphase stator and rotor windings, said motors and distributor having their rotor windings interconnected and their stator windings interconnected, a source of power, a motor for driving said distributor, a plurality of resistances, and an automatic system including a single manually operable switch for connecting all of said motors and said distributor to said power source in the following steps; first, connecting one phase of the stator windings of said Selsyn motors and one phase of the stator windings of said distributor to said power source, second, connecting the other two phases of the stator windings of said Selsyn motors and said distributor to said power source, and, third, connecting said distributor driving motor to said power source and connecting said resistances across the rotors of said Selsyn motors and said distributor.

12. A motor starting system in accordance with claim 11 in which said automatic system includes a thermionic device to obtain predetermined time intervals between said steps of operation.

13. A motor starting system in accordance with claim 11 in which said automatic system includes a thermionic rectifier having a relay in its output circuit, the time of operation of said relay being determined by the heating period of the filament of said rectifier and the time constant of said output circuit.

14. A starting system for an alternating current interlock system including a plurality of motors having polyphase stator and rotor windings, a distributor having polyphase stator and rotor windings, a driving motor for said distributor, and a polyphase power source comprising switch contacts for connecting one phase of said source to one phase of the stator windings of said motors and said distributor, switch contacts for connecting the other two phases of the source to the stator windings of said motors and distributor, switch contacts for connecting said source to said driving motor, switch contacts for interconnecting the rotor windings of said motors and said distributor, and thermionic relay means under control of a single switch contact for closing said first mentioned switch contacts, then said second mentioned switch contacts, and then said third and fourth mentioned contacts, said thermionic relay means providing predetermined time delays between said closing operations determined by the heating period of said thermionic relay means and the time constant of said relay circuit.

15. A starting system in accordance with claim 14 in which the actuation of said fourth mentioned contacts de-energizes said thermionic relay means.

BURTON F. MILLER.